United States Patent
Yoshida et al.

(10) Patent No.: US 12,087,963 B2
(45) Date of Patent: Sep. 10, 2024

(54) BATTERY MODULE

(71) Applicant: SANYO Electric Co., Ltd., Osaka (JP)

(72) Inventors: Naotake Yoshida, Hyogo (JP); Takuya Egashira, Hyogo (JP); Yusuke Fujii, Hyogo (JP); Nao Takeda, Hyogo (JP); Takuya Unehara, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 195 days.

(21) Appl. No.: 17/436,679

(22) PCT Filed: Dec. 26, 2019

(86) PCT No.: PCT/JP2019/051121
§ 371 (c)(1),
(2) Date: Sep. 7, 2021

(87) PCT Pub. No.: WO2020/188948
PCT Pub. Date: Sep. 24, 2020

(65) Prior Publication Data
US 2022/0140434 A1 May 5, 2022

(30) Foreign Application Priority Data
Mar. 19, 2019 (JP) ................................ 2019-051229

(51) Int. Cl.
*H01M 50/367* (2021.01)
*H01M 50/209* (2021.01)
(Continued)

(52) U.S. Cl.
CPC ....... *H01M 50/367* (2021.01); *H01M 50/209* (2021.01); *H01M 50/271* (2021.01); *H01M 50/264* (2021.01); *H01M 50/293* (2021.01)

(58) Field of Classification Search
CPC ............. H01M 50/367; H01M 50/209; H01M 50/271; H01M 50/264; H01M 50/293
See application file for complete search history.

(56) References Cited

U.S. PATENT DOCUMENTS

| | | | | |
|---|---|---|---|---|
| 4,207,387 A | * | 6/1980 | Jutte | H01M 50/367 429/88 |
| 5,800,942 A | * | 9/1998 | Hamada | H01M 10/6566 429/177 |
| 2012/0164490 A1 | | 6/2012 | Itoi et al. | |

(Continued)

FOREIGN PATENT DOCUMENTS

| | | | | |
|---|---|---|---|---|
| EP | 2475028 A1 | | 7/2012 | |
| JP | 2015-135763 | * | 7/2015 | .............. H01M 2/10 |

(Continued)

OTHER PUBLICATIONS

Machine translation of JP-2015/211025-A . . . Obtained from PE2E (Year: 2015).*

(Continued)

*Primary Examiner* — Michael L Dignan
(74) *Attorney, Agent, or Firm* — WHDA, LLP (57) ABSTRACT

The battery module includes: battery stack including a plurality of batteries that are stacked, each of the plurality of batteries having valve portion; duct plate configured to cover a surface of battery stack on which the plurality of valve portions are disposed, duct plate having gas discharge duct that is connected to valve portions of the respective batteries, and temporarily stores a blown-off gas; cover plate placed on duct plate; and flow path portion defined by duct plate and cover plate, flow path portion extending from gas discharge duct in a first direction that intersects with stacking direction and allowing leaking of the gas in gas discharge duct to an outside of battery module. Cover plate has opening through which a midst portion of flow path portion is communicable with the outside of the battery module.

5 Claims, 5 Drawing Sheets

(51) Int. Cl.
*H01M 50/271* (2021.01)
*H01M 50/264* (2021.01)
*H01M 50/293* (2021.01)

(56) References Cited

U.S. PATENT DOCUMENTS

| | | | | |
|---|---|---|---|---|
| 2014/0113167 | A1* | 4/2014 | Itoi | H01M 10/6566 |
| | | | | 429/82 |
| 2014/0322566 | A1* | 10/2014 | Kim | H01M 50/271 |
| | | | | 429/82 |
| 2015/0125720 | A1* | 5/2015 | Fujii | H01M 50/209 |
| | | | | 429/56 |
| 2017/0288186 | A1* | 10/2017 | Kruger | H01M 50/271 |
| 2020/0266506 | A1* | 8/2020 | Stuetz | H01M 10/6568 |
| 2021/0320337 | A1* | 10/2021 | Chen | H01M 6/50 |

FOREIGN PATENT DOCUMENTS

| | | |
|---|---|---|
| JP | 2015-135763 A | 7/2015 |
| JP | 2015-211025 A | 11/2015 |
| JP | 2016-054127 A | 4/2016 |
| KR | 10-2017-0069003 A | 6/2017 |
| WO | 2011/033713 A1 | 3/2011 |
| WO | 2013/161655 | 10/2013 |

OTHER PUBLICATIONS

Machine English translation of JP 2015-135763 (Year: 2015).*
Extended (Supplementary) European Search Report dated Apr. 4, 2022, issued in counterpart EP application No. 19919584.3. (9 pages).
International Search Report of PCT application No. PCT/JP2019/051121 dated Mar. 31, 2020.
English Translation of Chinese Search Report dated Nov. 25, 2022, issued in counterpart CN application No. 201980094249.4. (2 pages).
The Indian Office Action dated Feb. 6, 2023 for the related Indian Patent Application No. 202147045845, with English Translation. (5 pages).

* cited by examiner

BATTERY MODULE

CROSS-REFERENCE TO RELATED APPLICATIONS

This application is a U.S. national stage application of the PCT International Application No. PCT/JP2019/051121 filed on Dec. 26, 2019, which claims the benefit of foreign priority of Japanese patent application No. 2019-051229 filed on Mar. 19, 2019, the contents all of which are incorporated herein by reference.

TECHNICAL FIELD

The present invention relates to a battery module.

BACKGROUND ART

For example, as a power source for a vehicle or the like that requires a high output voltage, there has been known a battery module formed by electrically connecting a plurality of batteries to each other. In general, each of the batteries that form the battery module is provided with a valve portion that opens in response to an increase in inner pressure. For example, when a short circuit occurs in the battery so that the temperature rises, a gas is generated by a chemical reaction in the battery. As a result, when the inner pressure in the battery increases, a gas having a high temperature and a high pressure is blown off from the valve portion. With respect to a battery module including such batteries, PTL 1 discloses a battery module which includes: a battery stack in which a plurality of batteries are stacked; and a gas discharge duct which is fixed to one surface of the battery stack in such a manner that the gas discharge duct is connected to the valve portions of the respective batteries.

CITATION LIST

Patent Literature

PTL 1: WO 2013/161655 A

When a gas that is blown off from the battery is discharged to the outside of the battery module and is mixed with outside oxygen, there is a risk of the occurrence of fire outside the battery module. In order to ensure safety of a user of the battery module, it is required to delay the occurrence of fire outside the battery module for a predetermined time (for example, five minutes) after a gas is blown off. To satisfy this requirement, various countermeasures against occurrence of fire are applied to the battery module.

As a method of suppressing the occurrence of fire outside the battery module, a method is considered where a flow path portion that allows a gas discharge duct and the outside of a module to communicate with each other is provided to a battery module so that a gas blown off from a battery can be gradually leaked to the outside of the battery module through the flow path portion with a sufficient time. As a result, the temperature of a gas or fine particles blown off from the battery can be lowered so that the occurrence of fire outside the battery module can be suppressed. On the other hand, in recent years, battery modules are required to further increase their capacities. In order to satisfy such requirement, the development of batteries having higher capacities has been in progress. When a capacity of a battery further increases, an amount of a gas blown off from the battery increases so that a pressure in a flow path portion increases. In the future, when a capacity of a battery further increases so that an amount of a gas blown off from a battery further increases, there is a concern that a risk that a flow path portion is damaged by an inner pressure is increased so that the safety of a battery module is lowered.

The present invention has been made in view of such circumstances, and it is an object of the present invention to provide a technique which can enhance safety of a battery module.

According to one aspect of the present invention, there is provided a battery module having the following configuration. The battery module includes: a battery stack including a plurality of batteries that are stacked, each of the plurality of batteries having a valve portion through which a gas is blown off; a duct plate configured to cover a surface of the battery stack on which a plurality of the valve portions are disposed, the duct plate having a gas discharge duct that extends in a stacking direction of the batteries, is connected to the valve portions of the respective batteries, and temporarily stores a blown-off gas; a cover plate placed on the duct plate; and a flow path portion defined by the duct plate and the cover plate, the flow path portion extending from the gas discharge duct in a first direction that intersects with the stacking direction of the batteries and allowing leaking of the gas in the gas discharge duct to an outside of the battery module. The cover plate has an opening through which a midst portion of the flow path portion is communicable with an outside of the battery module.

Any combinations of the above-described constituent elements, and configurations that are obtained by expressing the present invention in the form of method, apparatus, system and the like are also effective as the configuration of the present invention.

According to the present invention, the safety of a battery module can be enhanced.

DESCRIPTION OF EMBODIMENT

Hereinafter, the present invention will be described based on a preferred exemplary embodiment with reference to the drawings. The exemplary embodiment is an exemplification and does not limit the invention. All technical features described in the exemplary embodiment and combinations of these technical features are not always essential to the invention. The same reference symbols are assigned to the identical or equivalent constituent elements, members and processes illustrated in the respective drawings. Repeated explanation of the identical or equivalent constituent elements, members, and processes is omitted when necessary.

Scales or shapes of respective portions illustrated in the respective drawings are set for convenience sake to facilitate the description of the portions. The scales or shapes of the portions should not be construed as limitation unless otherwise specified. Further, in a case where terms such as "first", "second", and the like are used in the present description and claims, these terms do not mean any order or the degree of importance unless otherwise specified, and are intended to be used to distinguish one configuration and another configuration from each other. Further, in each drawing, some members that are not important for describing the exemplary embodiment are omitted.

Figure 1:
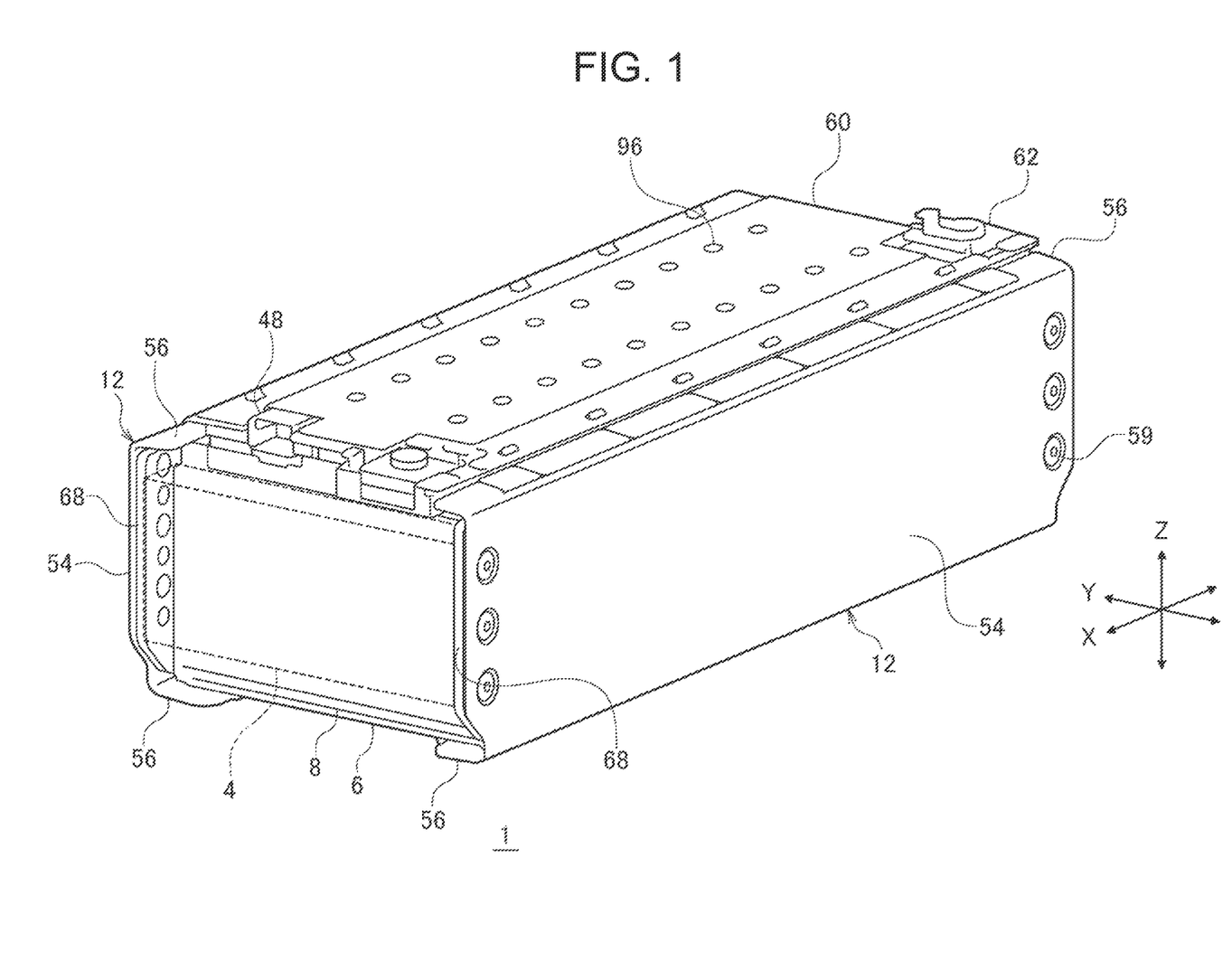
FIG. 1 is a perspective view of a battery module according to an exemplary embodiment.
Figure 2:
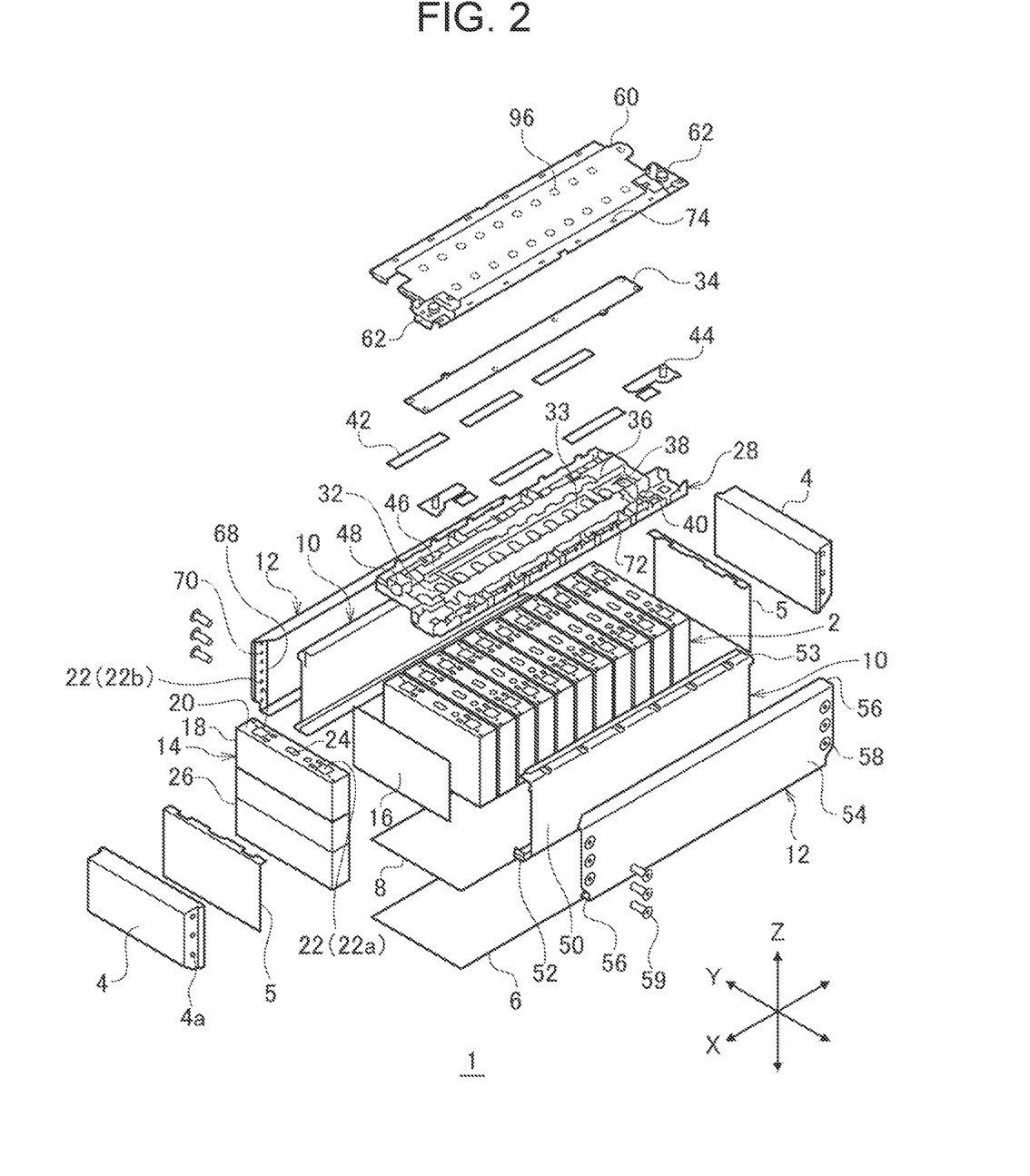
FIG. 2 is an exploded perspective view of the battery module.

FIG. 1 is a perspective view of a battery module according to an exemplary embodiment. FIG. 2 is an exploded perspective view of the battery module. Battery module 1 includes battery stack 2, a pair of end plates 4, cooling plate 6, heat conductive layer 8, side separators 10, constraining members 12, duct plate 28, and cover plate 60.

Battery stack 2 includes a plurality of batteries 14 and inter-cell separators 16. Each battery 14 is a chargeable secondary battery such as a lithium ion battery, a nickel-hydrogen battery, or a nickel-cadmium battery, for example. Each battery 14 is a so-called prismatic battery, and has exterior can 18 having a flat rectangular parallelepiped shape. Exterior can 18 has a substantially rectangular opening not shown in the drawings on one surface of exterior can 18. An electrode assembly, an electrolyte and the like are housed in exterior can 18 through the opening. Sealing plate 20 that closes the opening of exterior can 18 is disposed in the opening.

Output terminal 22 of a positive electrode is disposed on sealing plate 20 at a position close to one end of sealing plate 20 in a longitudinal direction, and output terminal 22 of a negative electrode is disposed on sealing plate 20 at a position close to the other end of sealing plate 20 in the longitudinal direction. The pair of output terminals 22 is respectively electrically connected to positive electrode plates and negative electrode plates that form the electrode assembly. Hereinafter, output terminal 22 of the positive electrode is referred to as positive electrode terminal 22a, and output terminal 22 of the negative electrode is referred to as negative electrode terminal 22b as appropriate. When there is no need to distinguish polarities of output terminals 22 from each other, positive electrode terminal 22a and negative electrode terminal 22b are collectively referred to as output terminals 22.

Exterior can 18, sealing plate 20, and output terminals 22 are electric conductors and are made of metal, for example. Sealing plate 20 and the opening of exterior can 18 are joined to each other by, for example, laser welding. Respective output terminals 22 are inserted into through holes (not illustrated) formed in sealing plate 20. A seal member (not illustrated) having insulating property is interposed between respective output terminals 22 and respective through holes.

In the description of the present exemplary embodiment, for convenience, sealing plate 20 forms an upper surface of battery 14, and a bottom surface of exterior can 18 disposed on a side opposite to sealing plate 20 forms a lower surface of battery 14. Battery 14 has two main surfaces that connect the upper surface and the lower surface of battery 14 to each other. The main surfaces are surfaces that have the largest area among six surfaces of battery 14. The main surfaces are long side surfaces that are connected to long sides of the upper surface and long sides of the lower surface. Two remaining surfaces other than the upper surface, the lower surface, and two main surfaces form side surfaces of battery 14. These side surfaces are a pair of short side surfaces that are connected to short sides of the upper surface and short sides of the lower surface.

For convenience, in battery stack 2, upper surfaces of batteries 14 form an upper surface of battery stack 2, lower surfaces of batteries 14 form a lower surface of battery stack 2, and side surfaces of batteries 14 form side surfaces of battery stack 2. These directions and positions are defined for convenience. Therefore, for example, the portion defined as the upper surface in the present invention does not always mean that the portion defined as the upper surface is positioned above the portion defined as the lower surface.

Valve portion 24 is disposed on sealing plate 20 between the pair of output terminals 22. Valve portion 24 is also referred to as a safety valve. Valve portion 24 is a mechanism which allows each battery 14 to blow off a gas in battery 14. Valve portion 24 is configured to release an internal gas by opening valve portion 24 when an inner pressure in exterior can 18 is increased to a predetermined value or more. For example, valve portion 24 is formed of; a thin wall portion that is formed on a portion of sealing plate 20 and is thinner than other portions of valve portion 24; and a linear groove formed on a surface of the thin wall portion. In this configuration, when an inner pressure in exterior can 18 increases, the thin wall portion is torn using the groove as a tearing starting point so that valve portion 24 is opened by tearing. Valve portions 24 of respective batteries 14 are connected to gas discharge duct 38 described later, and a gas in the battery is discharged from valve portion 24 to gas discharge duct 38.

Each battery 14 has insulating film 26. Insulating film 26 is, for example, a cylindrical shrink tube, and is heated after exterior can 18 is made to pass through insulating film 26. Accordingly, insulating film 26 shrinks and covers two main surfaces, two side surfaces, and bottom surface of exterior can 18. Insulating film 26 can prevent a short circuit between batteries 14 disposed adjacently to each other or a short circuit between battery 14 and end plate 4 or constraining member 12.

The plurality of batteries 14 are stacked to each other at a predetermined interval in a state where the main surfaces of batteries 14 disposed adjacently to each other face each other. The term "stack" means that a plurality of members are arranged in any one direction. Therefore, stacking of batteries 14 also includes an arrangement of the plurality of batteries 14 in a horizontal direction. In the present exemplary embodiment, batteries 14 are horizontally stacked. Accordingly, stacking direction X of batteries 14 is a direction extending horizontally. Hereinafter, when appropriate, a direction that is horizontal and is perpendicular to stacking direction X is referred to as horizontal direction Y, and a direction that is perpendicular to stacking direction X and horizontal direction Y is referred to as vertical direction Z.

Respective batteries 14 are disposed in a state where output terminals 22 are directed in the same direction. In the present exemplary embodiment, respective batteries 14 are disposed in a state where output terminals 22 are directed upward in the vertical direction. With respect to the respective batteries 14, when batteries 14 disposed adjacently to each other are connected in series, batteries 14 are stacked in a state where positive electrode terminal 22a of one battery 14 and negative electrode terminal 22b of other battery 14 are disposed adjacently to each other. When batteries 14 disposed adjacently to each other are connected in parallel, batteries 14 are stacked to each other in a state where positive electrode terminal 22a of one battery 14 and positive electrode terminal 22a of other battery 14 are disposed adjacently to each other.

Inter-cell separator 16 is also referred to as an insulating spacer, and is formed of a resin sheet having an insulating property, for example. As examples of the resin that are used for forming inter-cell separator 16, thermoplastic resins such as polypropylene (PP), polybutylene terephthalate (PBT), polycarbonate (PC), and Noryl (registered trademark) resin (modified PPE) are named. Inter-cell separator 16 is disposed between two batteries 14 disposed adjacently to each other and electrically insulates two batteries 14 from each other.

Battery stack 2 is sandwiched between the pair of end plates 4. The pair of end plates 4 is disposed at both ends of battery stack 2 in stacking direction X along which batteries 14 are stacked. The pair of end plates 4 is disposed adjacently to batteries 14 positioned at both ends of battery stack 2 in stacking direction X with external end separator 5 interposed between the end plate 4 and battery 14. External end separator 5 can be made of the same resin material as inter-cell separator 16. Each end plate 4 is a metal plate made of metal such as iron, stainless steel, or aluminum. By interposing external end separator 5 between end plate 4 and battery 14, end plate 4 and battery 14 are electrically insulated from each other.

Each end plate 4 has fastening holes 4a on two surfaces that are directed in horizontal direction Y. In the present exemplary embodiment, three fastening holes 4a are disposed at a predetermined interval in vertical direction Z. The surface where fastening holes 4a are formed faces flat surface portion 54 of constraining member 12. Flat surface portion 54 will be described later.

Duct plate 28 is placed on the upper surface of battery stack 2. Duct plate 28 is a plate-shaped member that covers the upper surface of battery stack 2, that is, duct plate 28 covers surfaces of respective batteries 14 on each of which valve portion 24 is disposed. Duct plate 28 has a plurality of openings 32 through which valve portions 24 are exposed at positions corresponding to valve portions 24 formed on respective batteries 14. The plurality of openings 32 are formed in base plate 33 extending along the upper surface of battery stack 2. Duct plate 28 includes gas discharge duct 38 that temporarily stores the gas blown off from respective batteries 14. Gas discharge duct 38 extends in stacking direction X of batteries 14 and is connected to valve portions 24 of respective batteries 14. Respective valve portions 24 communicate with gas discharge duct 38 through openings 32.

Gas discharge duct 38 is defined by: first wall portion 34 that covers the upper sides of the plurality of openings 32; and a pair of second wall portions 36 which surrounds the sides of respective openings 32. First wall portion 34 and the pair of second wall portions 36 respectively have an elongated shape elongated in stacking direction X. The pair of second wall portions 36 is arranged in horizontal direction Y with the plurality of openings 32 disposed between the second wall portions 36, and the respective wall surfaces of the pair of second wall portions 36 are directed in horizontal direction Y that intersects with stacking direction X of batteries 14. First wall portion 34 has a wall surface that faces in vertical direction Z along which duct plate 28 and cover plate 60 are arranged, and first wall portion 34 faces respective valve portions 24. The pair of second wall portions 36 protrudes from base plate 33 toward cover plate 60, and forms both side surfaces of gas discharge duct 38. First wall portion 34 is fixed to upper ends of the pair of second wall portions 36 to form a top surface of gas discharge duct 38.

Duct plate 28 has openings 40 through which output terminals 22 are exposed at positions corresponding to output terminals 22 of respective batteries 14. Bus bars 42 are placed on respective openings 40. The plurality of bus bars 42 are supported by duct plate 28. Accordingly, duct plate 28 also functions as a so-called bus bar plate. Bus bar 42 placed in respective openings 40 electrically connects output terminals 22 of batteries 14 disposed adjacently to each other.

Duct plate 28 of the present exemplary embodiment is made of a resin such as polypropylene (PP), polybutylene terephthalate (PBT), polycarbonate (PC), and Noryl (registered trademark) resin (modified PPE) except for first wall portion 34. First wall portion 34 is made of metal such as iron or aluminum. The pair of second wall portions 36 is integrally formed with base plate 33 by molding. First wall portion 34 is fixed to the pair of second wall portions 36 by fastening members (not illustrated) such as screws.

Bus bar 42 is a substantially strip-shaped member made of metal such as copper or aluminum. One end portion of bus bar 42 is connected to output terminal 22 of one battery 14, and the other end portion of bus bar 42 is connected to output terminal 22 of another battery 14. With respect to bus bars 42, output terminals 22 having the same polarity in a plurality of batteries 14 disposed adjacently to each other may be connected in parallel by bus bars 42 to form a battery block, and these battery blocks may be connected in series by bus bars 42.

Bus bars 42 connected to output terminals 22 of batteries 14 positioned at both ends in stacking direction X each have external connection terminal 44. External connection terminal 44 is connected to an external load (not illustrated). Voltage detection line 46 is placed on duct plate 28. Voltage detection line 46 is electrically connected to the plurality of batteries 14 to detect voltages of respective batteries 14. Voltage detection line 46 includes a plurality of conductive wires (not illustrated). One end of each conductive wire is connected to each bus bar 42, and the other end is connected to connector 48. Connector 48 is connected to an external battery ECU (not illustrated) or the like. Battery ECU controls detection of a voltage or the like of each battery 14, charging and discharging of each battery 14, and the like.

Cooling plate 6 has a flat plate shape extending in stacking direction X and in horizontal direction Y, and is made of a material having high thermal conductivity such as aluminum. Cooling plate 6 is thermally connected to battery stack 2. That is, cooling plate 6 is connected to battery stack 2 in a heat-exchangeable manner, and cools respective batteries 14. In the present exemplary embodiment, battery stack 2 is placed on a main surface of cooling plate 6. Battery stack 2 is placed on cooling plate 6 in a state where a lower surface of battery stack 2 faces a cooling plate 6. Accordingly, battery stack 2 and cooling plate 6 are arranged in vertical direction Z. Cooling plate 6 may be connected to an object disposed outside of battery module 1, for example, a vehicle body of a vehicle on which battery module 1 is mounted or the like in a heat-exchangeable manner. A flow path through which a refrigerant such as water or ethylene glycol flows may be disposed in cooling plate 6. With such a configuration, heat exchange efficiency between battery stack 2 and cooling plate 6 can be further enhanced and, eventually, cooling efficiency of batteries 14 can be further enhanced.

Heat conductive layer 8 is a member having an insulating property which is interposed between battery stack 2 and cooling plate 6. That is, cooling plate 6 is thermally connected to battery stack 2 by way of heat conductive layer 8. Heat conductive layer 8 covers the entire bottom surface of battery stack 2. The thermal conductivity of heat conductive layer 8 is higher than the thermal conductivity of air. Heat conductive layer 8 can be formed of, for example, a known resin sheet having good thermal conductivity, such as an acrylic rubber sheet or a silicone rubber sheet. In addition, heat conductive layer 8 may be made of a known adhesive agent, grease, or the like having favorable thermal conductivity and favorable insulating property. When exterior can 18 is sufficiently insulated by insulating film 26 or the like, heat conductive layer 8 may not have insulating property.

By interposing heat conductive layer 8 between battery stack 2 and cooling plate 6, thermal connection between respective batteries 14 and cooling plate 6 can be more reliably obtained. Therefore, the cooling efficiency of respective batteries 14 can be enhanced, and respective batteries 14 can be more uniformly cooled. In a case where heat conductive layer 8 has an insulating property, it is possible to prevent battery stack 2 and cooling plate 6 from being electrically connected to each other with more certainty. Heat conductive layer 8 can suppress displacement between battery stack 2 and cooling plate 6.

Side separators 10 are members that have an insulating property and insulate constraining members 12 and battery stack 2 from each other. In the present exemplary embodiment, the pair of side separators 10 is arranged in horizontal direction Y. Each side separator 10 has an elongated shape elongated in stacking direction X of batteries 14. Battery stack 2, the pair of end plates 4, cooling plate 6, and heat conductive layer 8 are disposed between the pair of side separators 10. Each side separator 10 is made of, for example, a resin having an insulating property. As a resin that is used for forming side separator 10, in the same manner as inter-cell separator 16, thermoplastic resins such as polypropylene (PP), polybutylene terephthalate (PBT), polycarbonate (PC), and Noryl (registered trademark) resin (modified PPE) are named.

Side separator 10 of the present exemplary embodiment has first portion 50, second portion 52, and third portion 53. First portion 50 has a rectangular flat plate shape, and extends in stacking direction X of batteries 14 along a side surface of battery stack 2. Second portion 52 has a strip shape extending in stacking direction X, and protrudes from a lower side of first portion 50 toward a battery stack 2. Third portion 53 has a strip shape extending in stacking direction X, and protrudes from an upper side of first portion 50 toward the battery stack 2. Accordingly, second portion 52 and third portion 53 face each other in the arrangement direction of battery stack 2 and cooling plate 6. Battery stack 2, cooling plate 6, and heat conductive layer 8 are disposed between second portion 52 and third portion 53.

Constraining members 12 are also referred to as bind bars, and are elongated members that are elongated in stacking direction X of batteries 14. In the present exemplary embodiment, the pair of constraining members 12 is arranged in horizontal direction Y. Each constraining member 12 is made of metal. As examples of metal used for forming constraining member 12, iron, stainless steel, and the like are named. Battery stack 2, the pair of end plates 4, cooling plate 6, heat conductive layer 8, and the pair of side separators 10 are disposed between the pair of constraining members 12.

In the present exemplary embodiment, constraining member 12 includes flat surface portion 54 and a pair of arm portions 56. Flat surface portion 54 has a rectangular shape, and extends in stacking direction X along the side surface of battery stack 2. The pair of arm portions 56 protrude toward a battery stack 2 from end portions of flat surface portion 54 on both sides in vertical direction Z. That is, one arm portion 56 protrudes from an upper side of flat surface portion 54 toward the battery stack 2, and the other arm portion 56 protrudes from a lower side of flat surface portion 54 toward the battery stack 2. Accordingly, the pair of arm portions 56 faces each other in the arrangement direction that battery stack 2 and cooling plate 6 are arranged. Battery stack 2, cooling plate 6, heat conductive layer 8, and side separators 10 are disposed between the pair of arm portions 56.

Contact plate 68 is fixed to regions of flat surface portion 54 that face respective end plates 4 by welding or the like. Contact plates 68 are members that are elongated in vertical direction Z. Through holes 70 are formed in contact plate 68 in a penetrating manner in horizontal direction Y at positions that correspond to fastening holes 4a formed in end plate 4. Through holes 58 are formed in flat surface portion 54 in a penetrating manner in horizontal direction Y at positions that correspond to through holes 70 formed in contact plate 68.

By making the pair of end plates 4 engage with flat surface portions 54 of respective constraining members 12, the plurality of batteries 14 are sandwiched between end plates 4 in stacking direction X. Specifically, battery stack 2 is formed by alternately arranging the plurality of batteries 14 and the plurality of inter-cell separators 16, and such battery stack 2 is sandwiched between the pair of end plates 4 with external end separators 5 sandwiched between battery stack 2 and end plates 4 in stacking direction X. Heat conductive layer 8 is disposed below the lower surface of battery stack 2 and, further, cooling plate 6 is disposed so as to face battery stack 2 with heat conductive layer 8 interposed between cooling plate 6 and battery stack 2. In such a state, battery stack 2, the pair of end plates 4, cooling plate 6, and heat conductive layer 8 are sandwiched between the pair of side separators 10 in horizontal direction Y. Further, the pair of constraining members 12 sandwiches the whole body in horizontal direction Y from the outside of the pair of side separators 10.

The pair of end plates 4 and the pair of constraining members 12 are aligned with each other in a state where fastening holes 4a, through holes 70, and through holes 58 overlap with each other. Fastening members 59 such as screws are made to pass through through holes 58 and through holes 70 and are made to threadedly engage with fastening holes 4a. With such a configuration, the pair of end plates 4 and the pair of constraining members 12 are fixed to each other. By making the pair of end plates 4 and the pair of constraining members 12 engage with each other, the plurality of batteries 14 are fastened to each other and are constrained in stacking direction X. Accordingly, respective batteries 14 are positioned in stacking direction X.

Constraining members 12 sandwich the plurality of batteries 14 in stacking direction X. Constraining members 12 also sandwich battery stack 2, heat conductive layer 8, and cooling plate 6 in the arrangement direction of battery stack 2, heat conductive layer 8, and cooling plate 6. Specifically, constraining members 12 sandwich the plurality of batteries 14 in stacking direction X in such a manner that both end portions of flat surface portions 54 of constraining members 12 in stacking direction X of batteries 14 engage with the pair of end plates 4. Battery stack 2, heat conductive layer 8, and cooling plate 6 are sandwiched between the pair of arm portions 56 of constraining members 12 in vertical direction Z. That is, constraining members 12 have both a function of fastening the plurality of batteries 14 and a function of fastening battery stack 2 and cooling plate 6. Therefore, unlike the conventional structure, battery stack 2 and cooling plate 6 are not fastened by screws.

In a state where the pair of constraining members 12 is fixed to the pair of end plates 4, first portion 50 of side separator 10 is interposed between the side surface of battery stack 2 and flat surface portion 54 of constraining member 12. With such a configuration, the side surfaces of respective batteries 14 and flat surface portion 54 are electrically insulated from each other. Second portion 52 of side separator 10 is interposed between cooling plate 6 and arm portion 56 of constraining member 12 on a lower side. With such a configuration, cooling plate 6 and arm portion 56 on the lower side are electrically insulated from each other. Third portion 53 of side separator 10 is interposed between the upper surface of battery stack 2 and arm portion 56 of constraining member 12 on an upper side. With such a configuration, the upper surfaces of respective batteries 14 and arm portion 56 on the upper side are electrically insulated from each other.

In a state where battery stack 2, heat conductive layer 8, and cooling plate 6 are sandwiched by the pair of arm portions 56 in vertical direction Z, heat conductive layer 8 is elastically deformed or plastically deformed by being pressed by battery stack 2 and cooling plate 6. Consequently, it is possible to obtain thermal connection between battery stack 2 and cooling plate 6 with more certainty. In addition, entire battery stack 2 can be cooled uniformly. Further, deviation between battery stack 2 and cooling plate 6 in the XY plane direction can be further suppressed.

As an example, after assembling of these constituent elements is completed, duct plate 28 is placed on battery stack 2. For example, duct plate 28 is fixed to battery stack 2 by making third portions 53 of the pair of side separators 10 engage with duct plate 28. Then, bus bars 42 are mounted on output terminals 22 of respective batteries 14 so that output terminals 22 of the plurality of batteries 14 are electrically connected to each other. For example, bus bars 42 are fixed to output terminals 22 by welding.

Cover plate 60 is placed on an upper surface of duct plate 28. Cover plate 60 is a plate-shaped member that covers duct plate 28 from above. Cover plate 60 according to the present exemplary embodiment is a so-called top cover that forms a portion of an outer shell of battery module 1, specifically, the upper surface of battery module 1. Cover plate 60 prevents dew condensation water, dust, or the like from being brought into contact with output terminals 22, valve portions 24 of batteries 14, bus bars 42 and the like. Cover plate 60 is made of a resin having an insulating property, for example. Cover plate 60 has insulating cover portions 62 at position overlapping with external connection terminals 44 in vertical direction Z. Cover plate 60 has openings 96. Respective openings 96 are connected to flow path portion 76 described later.

Both end portions of cover plate 60 in the first direction (horizontal direction Y in the present exemplary embodiment) are fixed to duct plate 28. Cover plate 60 of the present exemplary embodiment is fixed to duct plate 28 by snap-fitting. Specifically, duct plate 28 has a plurality of engaging claws 72 at both end portions of duct plate 28 in horizontal direction Y in a state where the plurality of engaging claws 72 are disposed at an interval in stacking direction X. Cover plate 60 has engaging holes 74 at positions overlapping with respective engaging claws 72 when viewed in vertical direction Z. When cover plate 60 is placed on duct plate 28, each engaging claw 72 is inserted into each engaging hole 74. With such insertion of engaging claws 72, both end portions of cover plate 60 in horizontal direction Y are fixed to duct plate 28. In a state where cover plate 60 is placed on duct plate 28, external connection terminals 44 are covered by insulating cover portions 62.

Figure 3:
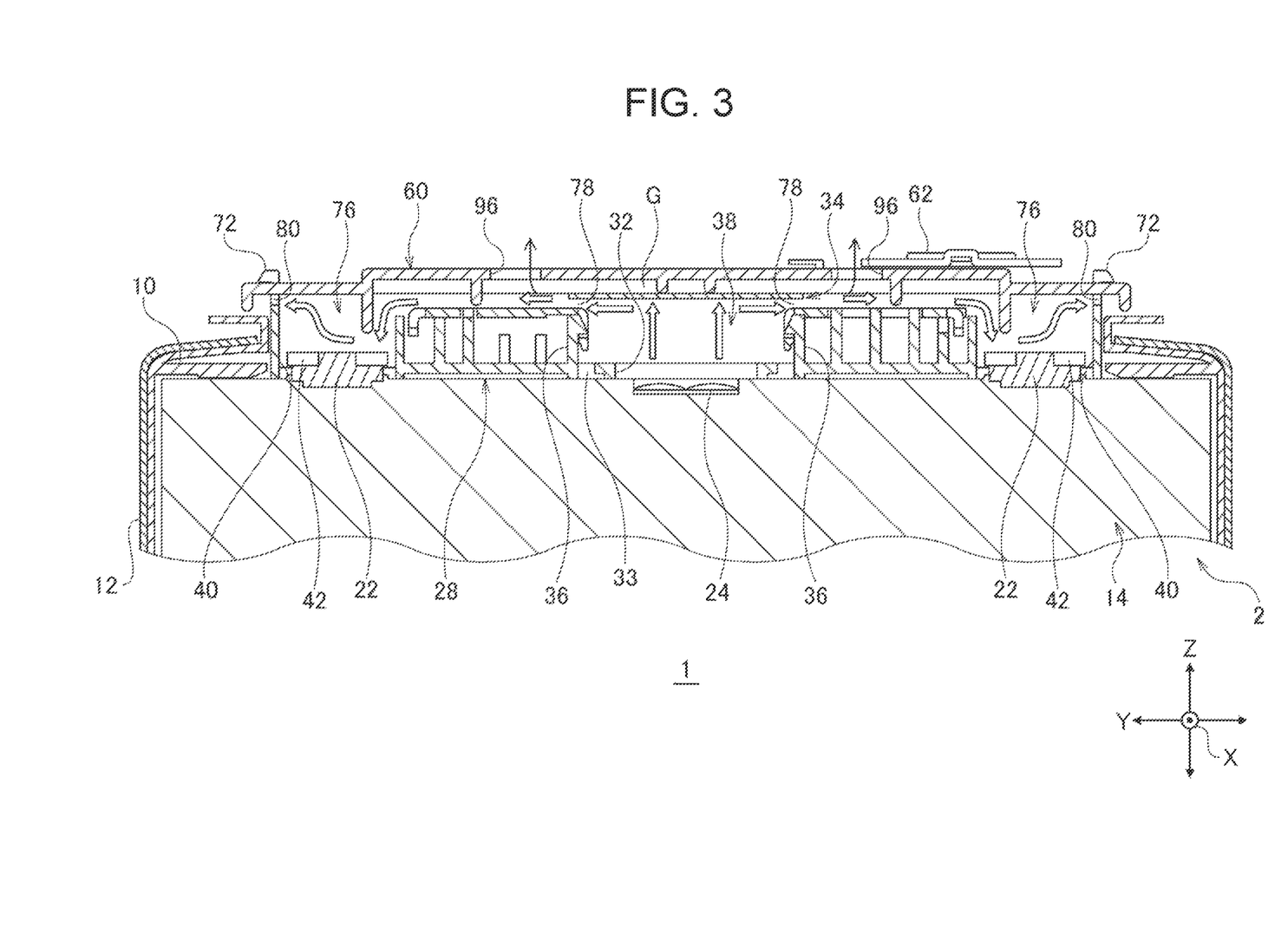
FIG. 3 is a cross-sectional side view of a region in which a duct plate and a cover plate of the battery module are disposed.
Figure 4:
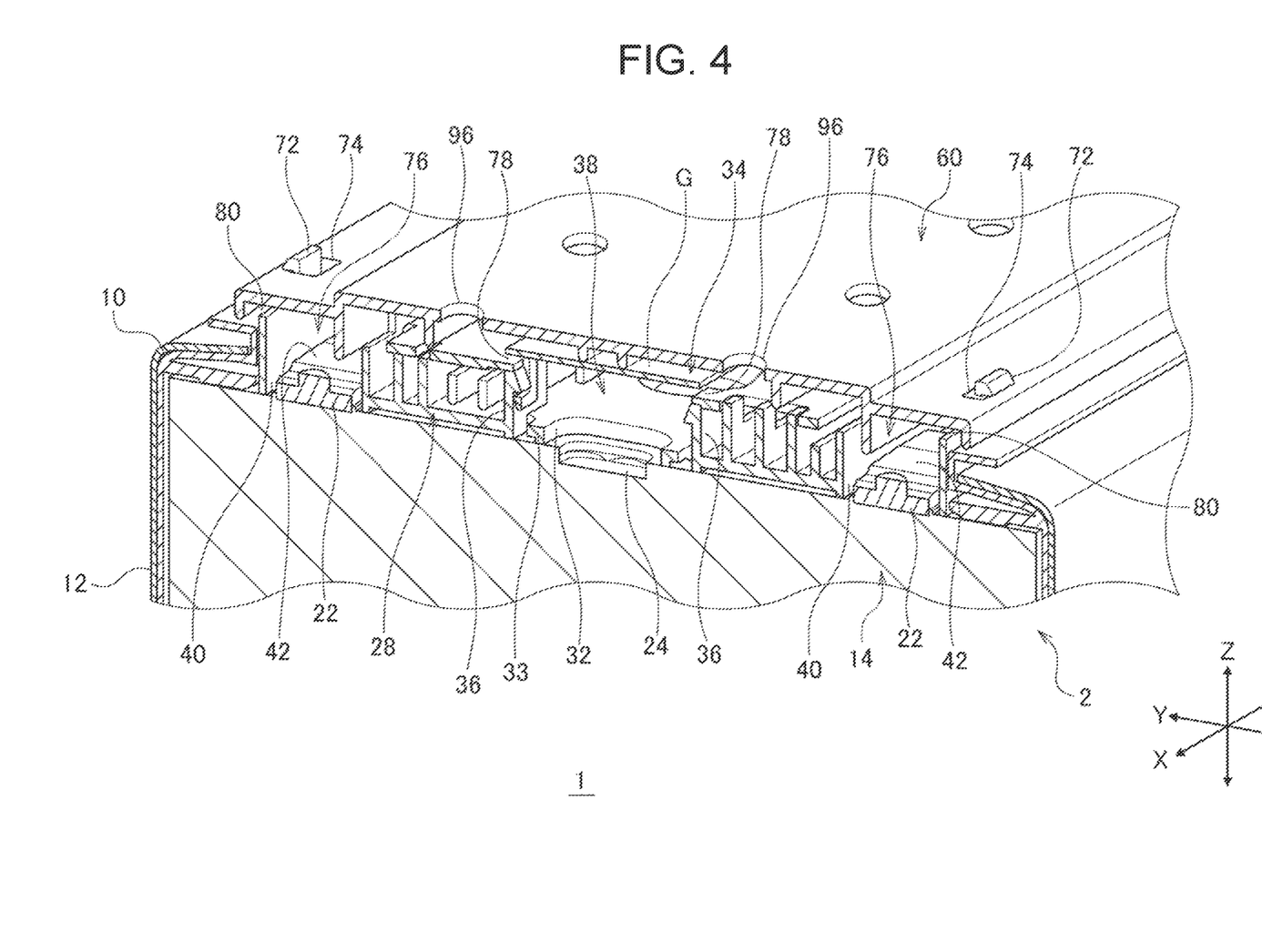
FIG. 4 is a cross-sectional perspective view of a region in which the duct plate and the cover plate of the battery module are disposed.

FIG. 3 is a cross-sectional side view of a region in which duct plate 28 and cover plate 60 of battery module 1 are disposed. FIG. 4 is a cross-sectional perspective view of the region in which duct plate 28 and cover plate 60 of battery module 1 are disposed. In FIG. 3 and FIG. 4, illustration of an internal structure of battery 14 is omitted.

Battery module 1 includes flow path portions 76. Flow path portions 76 are flow paths that allow a gas in gas discharge duct 38 to leak to the outside of battery module 1. Flow path portions 76 are defined by duct plate 28 and cover plate 60, and extend from gas discharge duct 38 in the first direction (horizontal direction Y in the present exemplary embodiment) intersecting with stacking direction X. In the present exemplary embodiment, flow path portions 76 are disposed on both sides in horizontal direction Y with gas discharge duct 38 sandwiched between flow path portions 76. Respective flow path portions 76 are connected to second wall portions 36 directed in horizontal direction Y of gas discharge duct 38. More specifically, opening 78 is formed in each of second wall portions 36, and one end portion of each of flow path portions 76 is connected to opening 78. The other end portions of respective flow path portions 76 are connected to flow path outlets 80 disposed at the end portions of battery module 1 in horizontal direction Y.

The plurality of openings 78 are formed in second wall portion 36 at a predetermined interval in stacking direction X, and one end portion of flow path portion 76 is connected to the plurality of openings 78. Flow path outlet 80 is an opening that is elongated in stacking direction X. Therefore, flow path portion 76 is a planar flow path that expands in stacking direction X and horizontal direction Y. Cover plate 60 is disposed in a state where predetermined gap G is formed between cover plate 60 and first wall portion 34 that faces valve portion 24 of gas discharge duct 38. That is, first wall portion 34 and cover plate 60 are spaced apart from each other in vertical direction Z by gap G. Both end portions of gap G in horizontal direction Y are connected to flow path portions 76. Therefore, two flow path portions 76 arranged in horizontal direction Y communicate with each other through gap G.

Cover plate 60 has openings 96 through which midst portions of flow path portions 76 are communicable with the outside of battery module 1. In the present exemplary embodiment, a plurality of openings 96 are formed in cover plate 60 on both sides of cover plate 60 in horizontal direction Y at a predetermined interval in stacking direction X in a state where gas discharge duct 38 is sandwiched between the plurality of openings 96 (see also FIGS. 1 and 2). One ends of respective openings 96 in vertical direction Z are connected to regions each between opening 78 of flow path portion 76 and flow path outlet 80. The other ends of respective openings 96 in vertical direction Z are connected to the outside of battery module 1.

When a gas in battery 14 is blown off from valve portion 24, the gas impinges on first wall portion 34 which face valve portion 24. The gas that impinges on first wall portion 34 flows along first wall portion 34 and flows into flow path portions 76 through openings 78. Most of the gas which flows into flow path portions 76 flows through flow path portion 76 in horizontal direction Y and in stacking direction X, and leaks to the outside of battery module 1 from flow path outlets 80.

At least a portion of the gas blown off from battery 14 is a combustible gas. The gas blown off from battery 14 also contains fine particles such as broken pieces of a battery structure. When a combustible gas having a high temperature and fine particles having a high temperature are discharged to the outside of battery module 1, and these gas or fine particles are mixed with oxygen outside the module, there is a risk that fire may occur outside battery module 1. On the other hand, in the present exemplary embodiment, a gas blown off from valve portion 24 is once received by gas discharge duct 38, and then is discharged to the outside of battery module 1 through flow path portion 76. As a result, a temperature of a gas or fine particles can be lowered before the gas or the fine particles are released to the outside of battery module 1. Accordingly, the occurrence of fire outside battery module 1 can be suppressed.

Portions of a gas flowing into flow path portions 76 from gas discharge duct 38 are discharged to the outside of battery module 1 through openings 96 formed in cover plate 60. As a result, a pressure in flow path portions 76 decreases. Therefore, it is possible to suppress an excessive increase in pressure in flow path portions 76.

In addition, the communication paths which are formed by the inner walls of openings 96 and allow flow path portions 76 and the outside of battery module 1 to be connected with each other extend in a direction in which a gas flows in flow path portion 76, that is, in vertical direction Z which is orthogonal to stacking direction X and/or horizontal direction Y. Fine particles having a mass larger than a mass of gas are likely to travel in flow path portions 76 in stacking direction X and/or in horizontal direction Y due to an inertial force of the fine particles. That is, the traveling direction of fine particles hardly changes in vertical direction Z. Accordingly, the fine particles are hardly discharged from openings 96 to the outside of battery module 1. Since a temperature of the fine particles is extremely higher than a temperature of the gas and the temperature of the fine particles is less likely to be lowered, it is desirable to retain the fine particles in flow path portions 76 for a longer time. Therefore, by discharging a larger amount of fine particles not from openings 96 but from flow path outlets 80, the occurrence of fire outside battery module 1 can be suppressed with more certainty.

In the present exemplary embodiment, a size of each opening 96 is set in a state where a flow path resistance of openings 96 becomes larger than a flow path resistance of flow path portion 76. The flow path resistance of flow path portion 76 is, for example, a flow path resistance at a portion having the largest flow path resistance in a region ranging from opening 78 to flow path outlet 80. As a result, it is possible to prevent an outflow amount of a gas from respective openings 96 from exceeding an outflow amount of the gas from the flow path outlets 80.

As has been described above, battery module 1 according to the present exemplary embodiment includes: battery stack 2 having the plurality of batteries 14 that are stacked, duct plate 28 placed on battery stack 2; cover plate 60 placed on duct plate 28, and flow path portions 76 defined by duct plate 28 and cover plate 60. Each of the plurality of batteries 14 of battery stack 2 has valve portion 24 through which a gas is blown off. Duct plate 28 includes gas discharge duct 38, and duct plate 28 covers the surface of battery stack 2 on which the plurality of valve portions 24 are disposed. Gas discharge duct 38 extends in stacking direction X of batteries 14, is connected to valve portions 24 of respective batteries 14, and temporarily stores a blown-off gas. Flow path portions 76 extend from gas discharge duct 38 in the first direction that intersects with stacking direction X of batteries 14, and makes a gas in gas discharge duct 38 leak to the outside of battery module 1. Cover plate 60 has openings 96 through which the midst portions of flow path portions 76 are communicable with the outside of battery module 1.

By connecting respective valve portions 24 to gas discharge duct 38, gas discharge duct 38 can receive an impact and a pressure of a blown-off gas. In particular, gas discharge duct 38 can receive a large impact or a rapidly rising pressure generated at an initial stage of blowing off of a gas. A gas blown off to gas discharge duct 38 gradually leaks to the outside of battery module 1 through flow path portions 76. Accordingly, it is possible to prevent a gas from being vigorously blown off to the outside of battery module 1. In addition, by allowing a gas gradually leak through flow path portions 76, a temperature of the gas or fine particles can be lowered until the gas or the fine particles reach flow path outlets 80. With such a configuration, it is possible to suppress the occurrence of fire outside battery module 1.

Further, by forming openings 96 in cover plate 60, a portion of a gas in flow path portion 76 can be discharged from openings 96. As a result, a pressure in flow path portion 76 can be lowered and hence, it is possible to suppress an excessive increase in pressure in flow path portion 76. As a result, it is possible to suppress a breakage of flow path portion 76 caused by blowing off of a gas from battery 14. Therefore, according to the present exemplary embodiment, safety of battery module 1 can be enhanced. In addition, it is possible to increase the capacity of battery module 1 while maintaining the safety of battery module 1.

In addition, an inner pressure in flow path portion 76 is reduced by forming openings 96 in cover plate 60. Accordingly, it is possible to suppress an increase in size of battery module 1 as compared with a case where an excessive increase in pressure in flow path portion 76 is suppressed by increasing a volume of flow path portion 76. In addition, since openings 96 are only formed in cover plate 60 and the number of components is not increased, it is possible to prevent the structure of battery module 1 from becoming complicated or large-sized.

The size of each opening 96 is set in a state where the flow path resistance of openings 96 is larger than the flow path resistance of flow path portion 76. As a result, it is possible to prevent an outflow amount of a gas from respective openings 96 from exceeding an outflow amount of the gas from the flow path outlets 80. Since the gas leaking from flow path outlet 80 remains in flow path portion 76 longer than the gas leaking from openings 96, the gas is discharged to the outside of battery module 1 in a state where the temperature is further lowered. Therefore, by increasing an outflow amount of gas from flow path outlet 80 more than an outflow amount of the gas from each opening 96, it is possible to achieve, with more certainty, both the suppression of an increase in inner pressure in flow path portion 76 and the suppression of the occurrence of fire outside battery module 1.

The exemplary embodiment of the present invention has been described in detail heretofore. The above-described exemplary embodiment is merely a specific example for carrying out the present invention. The contents of the exemplary embodiment do not limit the technical scope of the present invention, and many design changes such as changes, additions, and deletions of constituent elements can be made without departing from the spirit of the invention defined in claims. Novel exemplary embodiments with a design change acquire both advantageous effects of the exemplary embodiment and the modification that are combined with each other. In the above-described exemplary embodiment, with respect to the contents where such design changes are allowable, the contents are emphasized with expressions such as "of the present exemplary embodiment" and "in the present exemplary embodiment". However, the design changes are allowable even with respect to the contents which are not emphasized with such expressions. Any arbitrary combination of constituent elements included in the exemplary embodiment is also effective as the configuration of the present invention. Hatching applied to the cross sections in the drawings does not limit materials of objects to which hatching is applied.

(First Modification)

Figure 5:
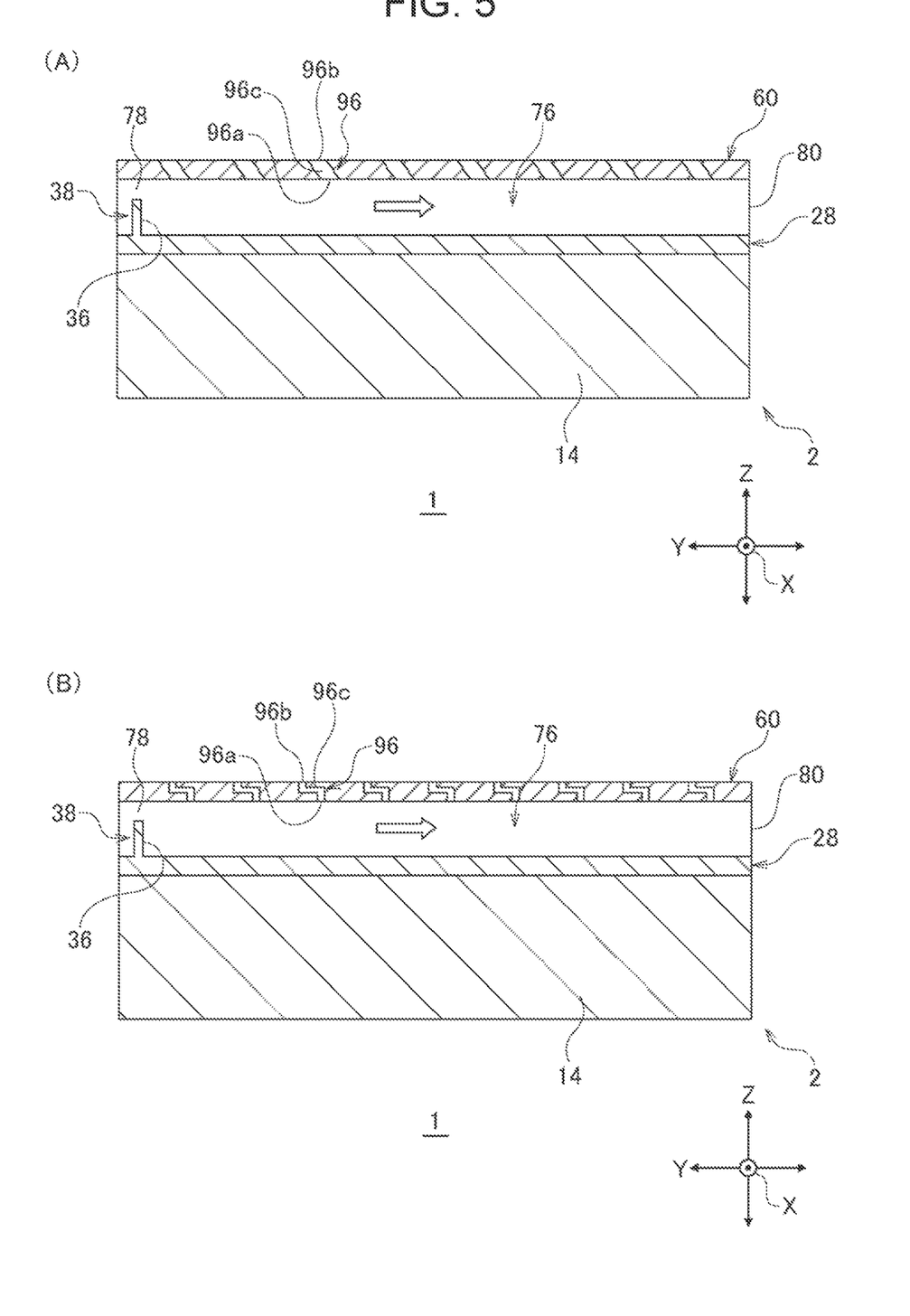
FIG. 5(A) is a cross-sectional view schematically illustrating a portion of a battery module according to a first modification.
FIG. 5(B) is a cross-sectional view schematically illustrating a portion of a battery module according to a second modification.

FIG. 5(A) is a cross-sectional view schematically illustrating a portion of battery module 1 according to a first modification. In FIG. 5(A), the illustration of an internal structure of battery 14 and first wall portion 34 is omitted. In battery module 1 of the first modification, when viewed from a direction in which cover plate 60 and duct plate 28 are arranged with each other (vertical direction Z in the present modification), first end portion 96a of opening 96 closer to a flow path portion 76 and second end portion 96b of opening 96 opposite to first end portion 96a are at least partially displaced from each other. With such a configuration, it is possible to reduce an area of flow path portion 76 exposed when viewed in vertical direction Z. Accordingly, it is more effectively prevent fine particles from being discharged to the outside of battery module 1 through openings 96.

In the present modification, second end portion 96b is disposed closer to gas discharge duct 38 than first end portion 96a in the first direction (horizontal direction Y in the present modification). Communication path 96c that connects first end portion 96a and second end portion 96b extends in a straight line from first end portion 96a toward second end portion 96b. Therefore, communication path 96c is inclined so as to gradually approach gas discharge duct 38 from first end portion 96a toward second end portion 96b.

A main flow of a gas in flow path portion 76 extends in horizontal direction Y from opening 78 toward flow path outlet 80. Therefore, by arranging second end portion 96b closer to gas discharge duct 38 than first end portion 96a, communication path 96c can be connected to the main flow of the gas at an acute angle. Accordingly, it is possible to more effectively prevent fine particles from being discharged from openings 96 to the outside of battery module 1.

(Second Modification)

FIG. 5(B) is a cross-sectional view schematically illustrating a portion of battery module 1 according to a second modification. In FIG. 5(B), illustration of the internal structure of battery 14 and first wall portion 34 is omitted. In battery module 1 of the second modification, in the same manner as the first modification, first end portion 96a and second end portion 96b are at least partially displaced from each other when viewed from a direction in which cover plate 60 and duct plate 28 are arranged with each other (vertical direction Z in the present modification).

In the present modification, communication path 96c that connects first end portion 96a and second end portion 96b to each other is bent or curved. FIG. 5(B) illustrates communication path 96c bent in a crank shape as an example. Specifically, second end portion 96b of the present modification is also disposed closer to gas discharge duct 38 than first end portion 96a in the same manner as the first modification. Communication path 96c extends upward from first end portion 96a and is bent at a substantially right angle toward a gas discharge duct 38 in an intermediate region in a thickness of cover plate 60. Further, communication path 96c extends in horizontal direction Y toward gas discharge duct 38, is bent toward a second end portion 96b at a substantially right angle immediately below second end portion 96b, and is connected to second end portion 96b.

By forming communication paths 96c into a bent or curved shape, it is possible to more effectively prevent fine particles from being discharged from openings 96 to the outside of battery module 1. In the case where communication path 96c is bent or curved, an area of flow path portion 76 exposed when viewed from vertical direction Z can be reduced without displacing first end portion 96a and second end portion 96b from each other in the XY plane direction.

(Others)

The number of batteries 14 that battery module 1 includes is not particularly limited. The structures of respective parts of battery module 1 including the shape of side separator 10 and the fastening structure between end plates 4 and constraining members 12 are not particularly limited. Battery 14 may have a cylindrical shape or the like. In a case where both heat conduction and a frictional force can be sufficiently ensured between battery stack 2 and cooling plate 6, heat conductive layer 8 may be omitted, and an insulating sheet made of PET or PC may be interposed between battery stack 2 and cooling plate 6. The arrangement and number of the openings 96 included in cover plate 60 can be appropriately set in consideration of a balance between an amount of gas discharged from flow path outlet 80 and an amount of gas discharged from openings 96, an amount of increase in inner pressure in flow path portion 76 and the like. The shape of communication path 96c in the second modification may be set in a state where a cross-sectional shape along a YZ plane perpendicular to stacking direction X may be an S shape, a lateral V shape (a shape obtained by rotating a V shape by 90°), a lateral U shape (a shape obtained by rotating a U shape by 90°) or the like.

REFERENCE MARKS IN THE DRAWINGS

1: battery module
2: battery stack
14: battery
24: valve portion
28: duct plate
38: gas discharge duct
60: cover plate
76: flow path portion
96: opening
96a: first end portion
96b: second end portion
96c: communication path

The invention claimed is:

1. A battery module comprising:
a battery stack including a plurality of batteries that are stacked, the plurality of batteries including valves through which a gas is blown off, the valves being disposed on a surface of the battery stack;
a duct plate configured to cover the surface of the battery stack, the duct plate including a gas discharge duct that extends in a stacking direction of the batteries, is connected to the valves of the batteries, and temporarily stores the gas blown off through the valves;
a cover plate placed on the duct plate; and
a flow path defined by the duct plate and the cover plate, the flow path extending from the gas discharge duct in a first direction that intersects with the stacking direction of the batteries and allowing leaking of the gas in the gas discharge duct to an outside of the battery module, wherein the cover plate includes an opening through which a midst part of the flow path is communicable with the outside of the battery module, the flow path has a first end portion thereof communicating with the gas discharge duct, and a second end portion thereof defining a flow path outlet, the opening is interposed between the first end portion and the second end portion of the flow path in a horizontal direction different than the stacking direction of the batteries, such that in at least one cross section perpendicular to the stacking direction of the batteries, the flow path is continuous from the gas discharge duct, past the opening, and then to the flow path outlet in a single direction, and the opening is configured to direct the gas therethrough in an upward direction to the outside of the battery module.

2. The battery module according to claim 1, wherein a size of the opening is set in a state where a flow path resistance in the opening is larger than a flow path resistance of the flow path.

3. The battery module according to claim 1, wherein, as viewed in a direction in which the cover plate and the duct plate are arranged with each other, a first end of the opening closer to a flow path portion and a second end of the opening opposite to a first end are at least partially displaced from each other.

4. The battery module according to claim 3, wherein the second end is disposed closer to the gas discharge duct than the first end in the first direction.

5. The battery module according to claim 1, further comprising a communication path:
wherein the communication path that connects a first end of the opening closer to the flow path and a second end of the opening opposite to the first end is bent or curved.

* * * * *